United States Patent [19]

Harvey et al.

[11] 3,876,135

[45] Apr. 8, 1975

[54] CENTRIFUGE FOR SEPARATION OF OIL FROM WATER

[75] Inventors: Andrew C. Harvey, Waltham; Allan T. Fisk, West Newton, both of Mass.

[73] Assignee: Foster-Miller Associates, Inc., Waltham, Mass.

[22] Filed: Mar. 12, 1973

[21] Appl. No.: 340,341

[52] U.S. Cl. .................... 233/3; 233/17; 233/32; 233/31
[51] Int. Cl. ............................................. B04b 1/06
[58] Field of Search ............. 233/2, 3, 7, 8, 27, 28, 233/29, 31, 37, 43, 32, 17, 46

[56] References Cited
UNITED STATES PATENTS

| | | | |
|---|---|---|---|
| 2,197,120 | 4/1940 | Bergmann | 233/3 X |
| 2,485,390 | 10/1949 | Langmuir | 233/17 |
| 2,767,841 | 10/1956 | Cram | 233/8 X |
| 3,209,995 | 10/1965 | Prijatel | 233/3 |
| 3,695,509 | 10/1972 | Javet | 233/46 X |

*Primary Examiner*—George H. Krizmanich

[57] ABSTRACT

There is disclosed a unique centrifuge for separation of oil from water comprising a three stage rotor having a swept vane separation stage, a closely spaced axial plate spiral wrap coalescer secondary stage and a swept vane separation tertiary stage.

9 Claims, 10 Drawing Figures

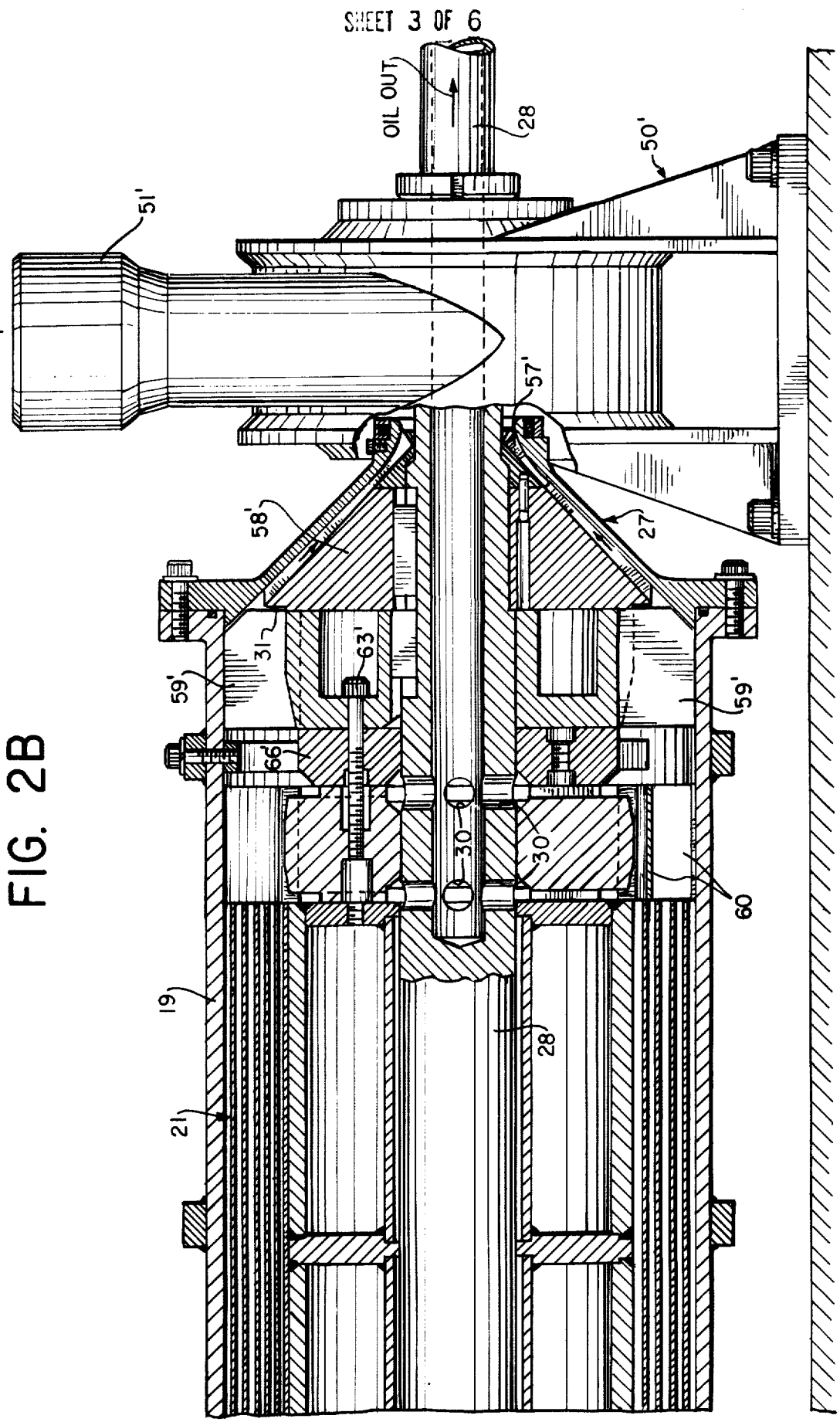

CENTRIFUGE FOR SEPARATION OF OIL FROM WATER

BACKGROUND OF THE INVENTION

Because of the tightening of anti-pollution laws there is a need for oil-water separators which will remove the oil from oil-water mixtures which one encounters in shipboard applications. The Water Quality Improvement Act of 1970 prohibits any harmful discharge of oil into the waterways of the United States. A proposed amendment to the International Convention for the Prevention of Pollution of the Sea by Oil, 1954, would prohibit the discharge of oil into the sea by a tanker when within 50 miles of the nearest land. The Environmental Protection Agency has issued regulations to implement the former act. These regulations define a "harmful discharge" of oil as one which violates applicable Water Quality Standards or causes a sheen or discoloration on the surface of the water by 1975 or 1980 at the latest.

The different areas of shipboard application that give rise to oil discharge into the sea at present are described in the following section.

There are three main areas of shipboard application in which it is desirable to separate oil from oil-water mixtures:

1. Bilge water: At present, bilge water on most ships is pumped directly into the sea. Bilge water includes the collection of drains, drippings and leakages from water, lubricating oil, hydraulic oil and fuel oil systems. As such, it consists typically of a mixture of water, light oils, and the additives associated with these oils.

A bilge water removal rate of at least 10 gpm is considered a target for combatant ships. The bilge water removal rate for merchant marine ships is expected to be somewhat higher.

2. Ballast water: Ballast water is used for stabilizing ships by filling their empty fuel tanks with sea water, or, as in the case of oil tankers, by filling their empty oil cargo space. During de-ballasting, which usually occurs just before entering harbors, the oil that the water picks up in the tanks ends up as a pollutant in the sea. For this application the flow rates are in the neighborhood of 600–3,000 gpm per pump for Naval combatant ships and 10,000 gpm for oil tankers. The oil in the ballast water will therefore vary with the fuel or oil cargo of the ship and will cover the entire range from light diesel through heavy No. 6 fuel oil to crude oil.

3. Concentration of oil picked up from the sea: Several devices are now in operation which are used for recovering oil from oil spills at sea. The oil picked up by these devices will usually be mixed with large amounts of water, especially if the operation was carried out in rough seas. Several carriers are available for transporting this oil to shore. One of these employs large rubber "bags" which are filled with oil and towed ashore. The capacity of the largest bags available at present is 500 tons each. If the concentration of the oil in the mixture could be raised from 30 to 50 percent to around 95 to 100 percent, the effective capacity of the bag system would be increased considerably.

Of the above applications, the first two have one thing in common: the concentration of oil in water is low, usually less than 10 percent. However, there is a difference in that a bilge water separator would only have to handle throughflows of the order of 100 gpm or less, whereas a separator for ballast water cleaning would require up to 10,000 gpm. The throughflow requirements and concentrations for emulsions coming from ocean spills are dependent upon the type of equipment used for cleaning them up and are not as firmly specified at this time as are the others.

From the point of view of separator design it is important to know more about the properties of the specific emulsions to be separated. These are, in turn, dependent upon the properties of the oils involved and upon the mechanisms of emulsification and coalescence. These topics are discussed in the following sections.

The oils of interest may be divided into three broad categories: (1) Lubricating oils that are likely to find their way into bilge water; (2) Fuel oils which may end up in ballast and bilge water; and (3Crude oils.

1. Lubricating oils have been standardized by the Society of Automotive Engineers, and their properties are well documented. For our present purposes, the pertinent properties are their specific gravities, which vary between approximately 0.84 and 0.90 and viscosities, which vary between $10^2$ and $10^4$ centistokes, in the temperature range of interest.

2. The properties of fuel oils have been standardized as per ASTM Standard No. D396 48T (1959). Under normal ambient conditions, fuel oils nos. 2 and 6 are representative of low- and high-viscosity oils respectively. Because of the very high viscosity of No. 6 (Bunker C) oil at normal ambient temperatures, it may give trouble during handling as it is separated from the emulsion.

The specific gravity of the Navy Special fuel oils is very close to 1 and that of Bunker C is heavier than pure water over a significant portion of the operating temperature range. This reduces the driving force for separation and, in some cases, reverses it, requiring that special attention be given to the problem of separating the heavier fuel oils.

3. The specific gravities of common crudes are significantly less than 1, making them well adapted to centrifugal separation. Their viscosities, too, are within an acceptable range of processing through the proposed system.

Any system designed for oil-water separation should be compatible with the existing equipment, space and power available in ships. It should be safe to operate and be insensitive to variations in temperature and suspended matter in the input to the separator. Further, the efficiency of the system should not be affected by attitude or the motion of the ship.

The inlet flow to the separator will consist typically of an oil-in-water emulsion together with debris, rust and other particulate solid matter. In the case of oil picked up from oil slicks on the sea, there is also an additional possibility of the presence of fish remains, plankton and other flotsam. The level of emulsification will depend on the type and concentration of oil as well as on the mechanism which led to the formation of the emulsion. In general, there are three mechanisms responsible for this: (1) the "sloshing mode" of mixing for ballast and bilge water, (2) shear and turbulence-induced emulsification which occurs when an oil-water mixture is passed through a centrifugal pump, and (3) the mixing that occurs on the sea surface at the oil-slick-water interface due to wave motion.

Thus, it is extremely important to have a quantitative measure of the emulsion characteristics as produced by these different modes. One representative method of characterizing emulsions is by its drop size distribution. However, despite the tremendous effort that has gone into trying to understand the mechanics of emulsification, very little quantitative information is available on drop size distribution. For example, given an oil in water mixture which has been mixed or emulsified in a controlled manner, there is no formula which predicts the drop size distribution function. Thus, information of this nature has to be generated experimentally within the current state of the art. Accordingly, a part of our development effort was devoted to the quantitative measurement of drop size distributions of oil-water emulsions produced by a variety of controlled methods designed to simulate shipboard emulsification.

Since every ship has bilge water and ballast water pumps, it would seem that an ideal separator would be one that could be directly coupled to an existing pump. The centrifuge developed in this program can be designed to be flow driven, providing only that the through-flow stream contains the necessary driving energy. It has the added capability of being easily adaptable to larger flows through modularization; i.e., the connection of several separators in parallel.

SUMMARY OF THE INVENTION

In accordance with the present invention, a centrifuge for the separation of substantially immiscible liquids as a mixture of light and heavy liquids is constructed having a casing, liquid inlet means into said casing for admission thereto of a mixture of said light and heavy liquids, a rotor within said casing, means for journalling said rotor, said rotor having three stages, said first stage comprising a multiplicity of axially and radially extending surface members spaced apart sufficiently to permit relatively large drops of the light liquid to flow as drops and streams substantially radially toward the axis of said rotor as the heavy liquid is forced to migrate substantially radially outwardly toward the casing under the influence of centrifugal forces, means for permitting flow of said light liquid from radially inward portions of said rotor and from said casing, the second stage comprising means defining relatively substantially narrow axial passages extending lengthwise and centrally of the rotor, for receiving flow of unseparated light and heavy liquids from said first stage, the length and number of said passages being sufficient to cause coalescence of relatively small drops of said light liquid to form larger drops thereof during axial flow of said light and heavy liquids in a direction away from said first stage, a third stage comprising a multiplicity of axially and radially extending surface members and means for receiving flow of heavy and light liquids from said second stage, said surface members being spaced apart sufficiently to permit the relatively large drops received from said second stage to separate from said heavy liquid and to flow substantially radially inwardly as said drops are displaced from said heavy liquid under the influence of centrifugal forces, means for removing said drops of light liquid from said rotor and casing and outlet means for removing the heavy liquid from said casing adjacent to said third stage.

In a particular embodiment, the surface members of the first and third stages are vanes whose radially outer portions are substantially parallel and are inclined in an intermediate radial and tangential direction. In one particular form of centrifuge disclosed herein the second stage consists of a series of closely spaced thin sheets concentric with the rotor axis. In other forms, the second stage is a porous open-celled material or a fibrous material. Means are also provided for accelerating liquid inlet flow to nearly the peripheral velocity of the rotor prior to the first stage so that liquid flow thereafter is substantially only axial with respect to the spinning rotor. A bladed turbine downstream of the third stage can be used to recover energy from the effluent prior to its discharge.

This program was devoted to the design, development, fabrication, and performance testing of the concept of a centrifuge separator for the separation of oil as it is usually dispersed in the bilge and ballast water of ships. The centrifuge is unusual in having predominantly axial flow allowing high throughput and low rotor speed. It has primary, secondary and tertiary stages of separation incorporated into the design and is thus capable of operating with high input concentrations.

Effluent concentrations in the range of 10 ppm were obtained with inputs containing 1,000 ppm of No. 2, No. 4 and Nigerian Crude Oils. At higher concentrations ranging up to 58,800 ppm for No. 2 oil and 18,900ppm for No. 4 oil, the effluent contained less than 100 ppm. Centrifuge performance on No. 2 and No. 4 oils containing 10 percent Gamlen D was lower than with pure oils requiring a modification to the separator design. The input and output oil droplet size distributions were measured using a Coulter particle counter. This permitted an evaluation of separator performance as a function of the drop size content of the oil dispersion and a rational assessment of the design method and its application to the development of future prototypes.

BRIEF DESCRIPTION OF THE DRAWING

FIG. 9 is an illustration of another form of coalescer using fibrous material.

FIG. 10 is a detailed list of parts which were indicated by circled numbers on FIG. 4.

DESCRIPTION OF PARTICULAR EMBODIMENTS

Figure 1:
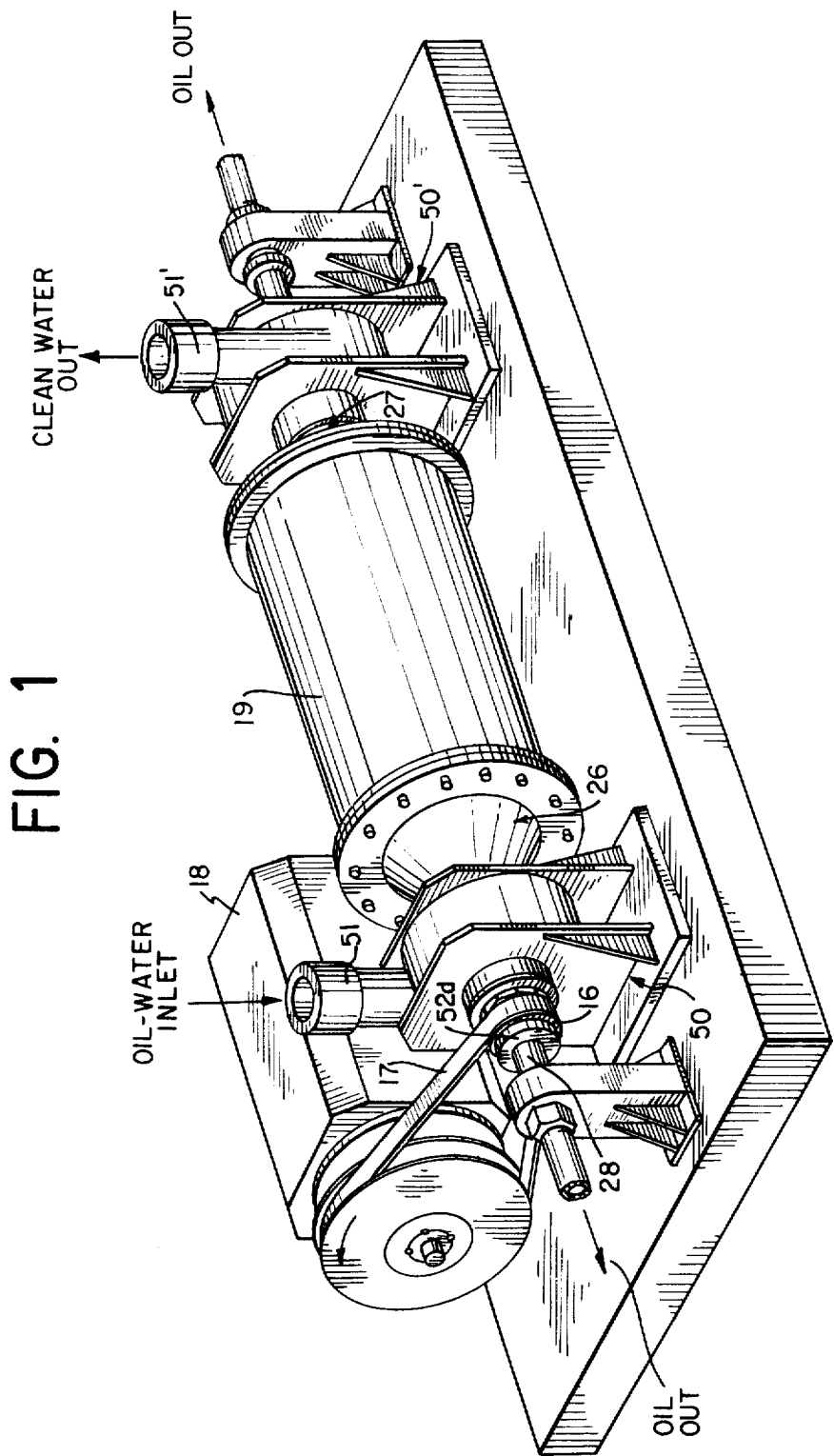
FIG. 1 is an isometric illustration with parts cut away of the centrifuge of the invention.
Figure 2A:
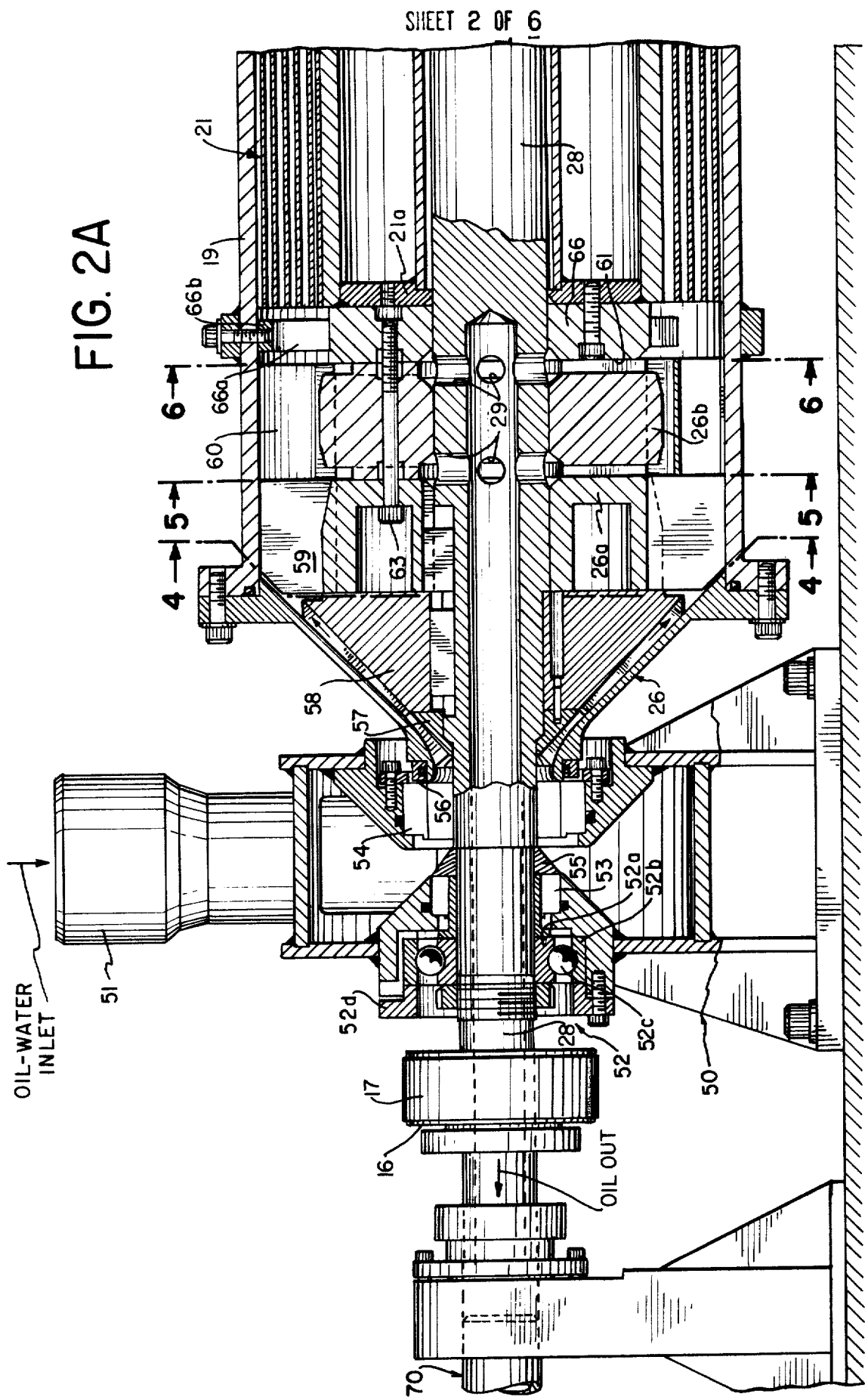
FIG. 2 is a reproduction of a photograph of the centrifuge of FIG. 1.
Figure 3:
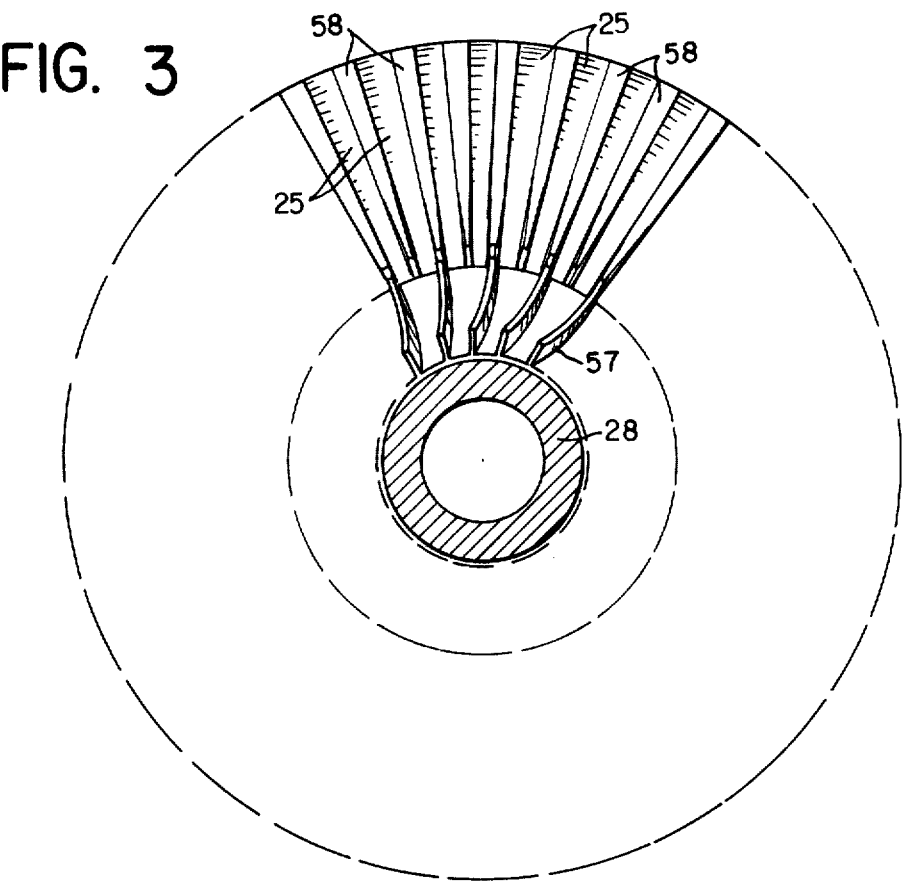
FIG. 3 is a reproduction of a photograph showing the entire rotor sequence.
Figure 4:
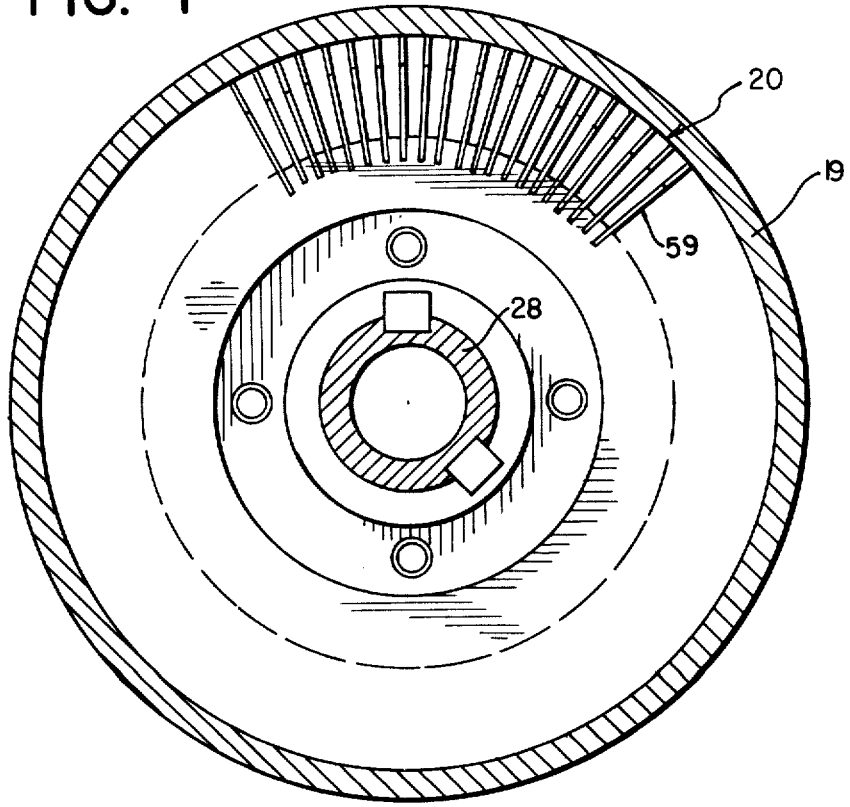
FIG. 4 illustrates the detailed assembly of parts of the centrifuge of FIG. 1. The spiral wrapped coalescer is not shown.

A schematic illustration of the centrifuge of the invention is shown in FIG. 1. As shown in FIGS. 2A and 2B, the centrifuge consists basically of a three stage rotor comprising a primary stage swept vane separator 20 to separate the large drops; a closely spaced, axial plate, spiral wrap coalescer 21 to coalesce the small drops and a tertiary stage swept vane separator 22 to collect and separate the coalesced oil.

A casing 19 surrounds the inner rotor assembly. In this particular embodiment the casing 19 is affixed to the inner rotor assembly and is driven with it by means of drive motor 18, belt 17, and pulley 16. It is recognized that other designs could have this casing remain stationary.

At the inlet to the centrifuge the conical ends of the rotor contain blades 57-59 (to be described in more detail) and passageways 25 that act as centrifugal pump 26. At the outlet end are centripetal turbine 27 elements. Thus, the flow entering and leaving the rotor has relatively low swirl velocity, but it is maintained at full rotor peripheral velocity in the axial annulus at little expense of energy. FIGS. 2A and 2B show the rotor sequence in which the flow would proceed from left to right.

Figure 5:
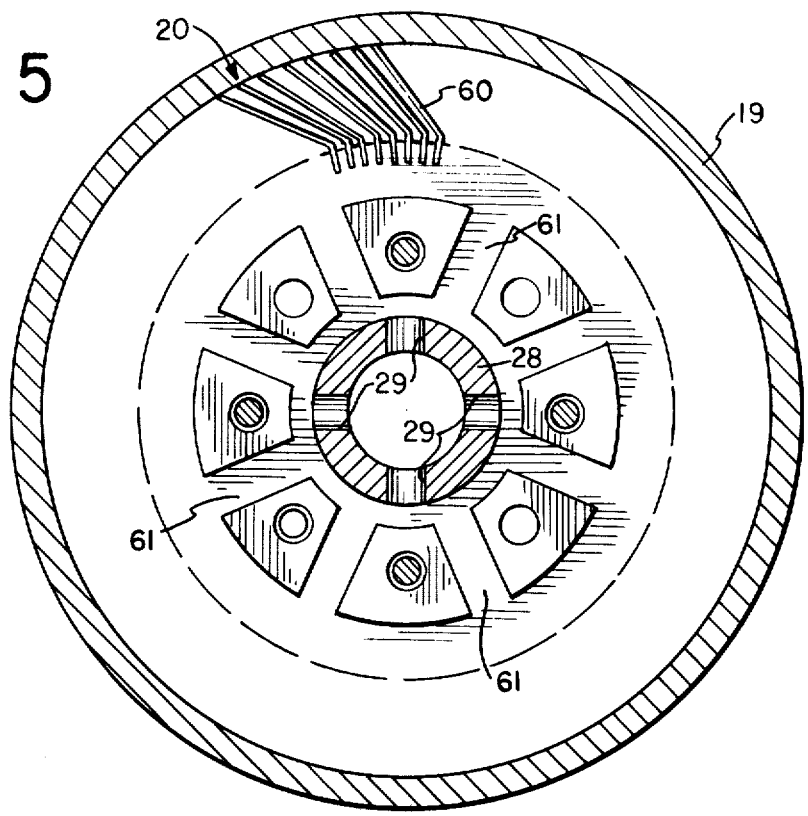
FIG. 5 is a perspective view of the first stage of the rotor showing the conical pump section and radial vanes.

It will be seen that the rotor shaft 28 is hollow and that radial passages 29 and 30 connect the radially inward edges of vanes 60 and 23 respectively with the interior of the rotor shaft 28. A liquid mixture containing oil and water will first be brought substantially to the peripheral velocity of the rotor by pump 26. That is to say, thereafter, the liquid mixture will have essentially only axial flow with respect to the spinning rotor in the direction of the arrows as shown. The liquid enters the vanes 57 and 58, achieves peripheral velocity, enters straightener vanes 59 and finally vanes 60 which (as shown in FIG. 5) are inclined in an intermediate radial/tangential direction. Due to centrifugal forces acting upon the liquid mixture, relatively large drops of oil are displaced by water forced to migrate outwardly toward the casing and the oil drops will flow inwardly through passages 29 into the shaft 28. Thereafter, the mixture, now containing only small droplets flows into the second stage or coalescer 21 comprising coalescing plates 68. The plates 68 are generally concentrically arranged with respect to the rotor axis and comprise long axial passages, closely spaced radially. The centrifugal forces force the oil droplets to move inwardly so that the droplets impact the walls or other droplets to form large droplets or oil films. Oil film migration on the walls is caused by fluid shear of the main water flow vis a vis oil flow and by pressure forces. The length of the respective passages must be such that for a particular application, substantially all small droplets of oil in the mixture which remain after the first stage separation will be coalesced into larger drops or into a film which breaks up into relatively large drops at the entrance to the third stage. The heavier water and oil droplets entering the third stage pass between vanes 23 as are vanes 60, the water migrating radially outwardly, and the oil flowing inwardly by means of passages 30 into the rotor shaft for removal from the casing. It will be noted that a dam 31 is provided in the third stage over which water must flow, thus trapping oil downstream of passages 30 to flow back into passages 30.

Having thus described the essential parts of the centrifuge in relation to the function of each principal part, further examination of FIGS. 2A and 2B and FIGS. 3-6 will reveal more particularly the details of construction. Accordingly, end housings 50, 50' include effluent inlet connection 51 and effluent outlet connection 51' respectively for the admission of mixtures of liquids and the emission of effluent which has had contaminant removed therefrom. The end housings also function to support the rotor shaft 28, the bearing assembly shown in FIG. 2A being typical. Such assembly comprises the ball bearing 52 having inner and outer races 52a, 52b and a plurality of ball bearings 52c. The retaining ring 52d holds the foregoing bearing elements in place. Seals 53 and 54 block the passage of effluent flowing from inlet 51 into the centrifuge pump 26. Wear rings 55 and 56 bear against seals 53 and 54.

As will be seen, with reference to FIG. 2A, centrifugal pump 26 comprises a first and second series of vanes 57 and 58 whose function is to guide the fluid radially until peripheral speed is achieved, that is to say the same speed as the rotor. Thereafter, as seen also in FIG. 4, a series of blades 59 straightens (makes laminar and uniform) the effluent flow after it has achieved the necessary peripheral speed. A final set of vanes 60, as shown in FIG. 5, are the slant vanes which slant in a direction intermediate a truely axial or a truely radial direction. It is during passage through slant vanes 60 that separation of oil from water takes place, the slant of the vanes causing the oil to impinge upon the upper surfaces of each vane 60 as relative displacement of water outwardly and oil inwardly takes place due to centrifugal action. This is the same function performed by slant vanes 23. As best seen in FIG. 5, oil passes along the upper surfaces of vanes 60, will migrate inwardly to pass through slots 61 in the face of the rotor and thence into passages 29 in the shaft 28 for subsequent removal through the oil outlet 70.

Figure 6:
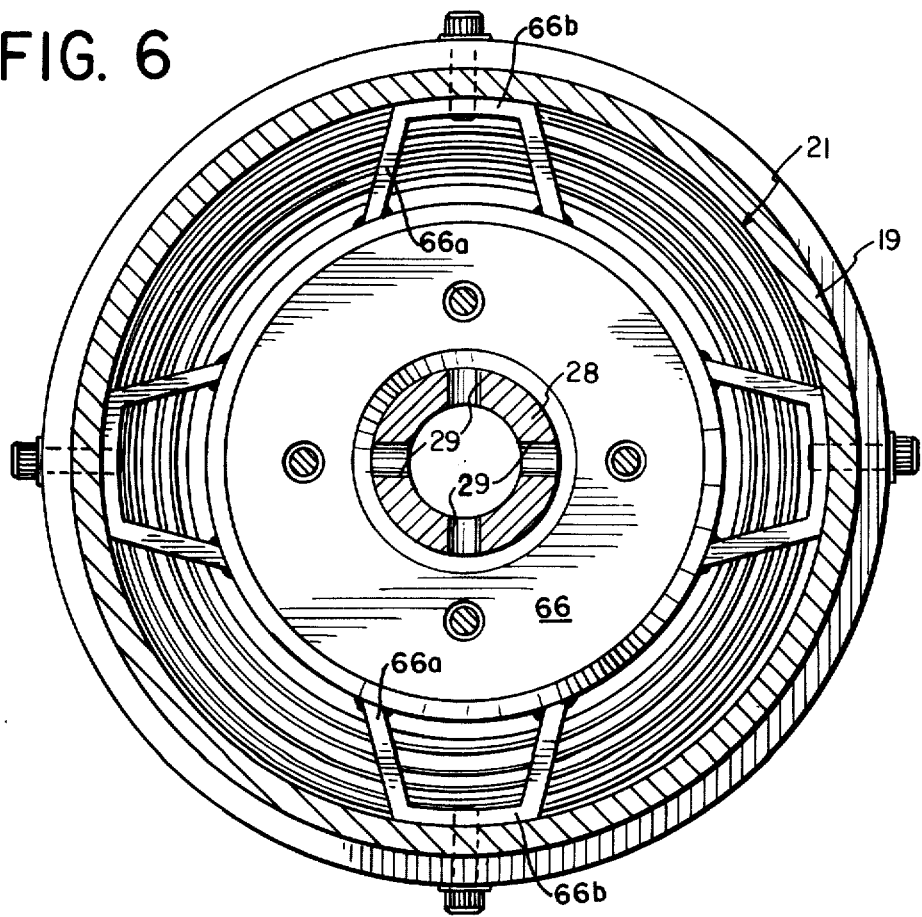
FIG. 6 is a perspective view of the first stage of the rotor showing the shaft and the radially/tangentially inclined outer portions of the vanes of the first stage.

It will be seen that the elements of the pump 26 and the coalescer 21 are secured by a series of bolts 63 which pass through elements 26a and 26b of the pump, and through a core 21a of the coalescer, all secured to the outer casing 19 by the intermediate agency of the spider 66 (See FIGS. 2A and 6). Legs 66a of the spider, together with joining sections 66b, are secured to the casing 19 by bolts 67. The respective plates 68 of the coalescer abut the legs 66a and are spaced apart in conventional manner (not shown).

The structure just described is essentially duplicated in FIG. 2B and need not be described in detail, one difference being that the spider 66' is intermediate the slant vanes 23 and final straightener vanes 60'. End housing 50' houses a bearing assembly similar in all respect to the bearing assembly described in connection with the end housing 50.

SEPARATOR PERFORMANCE TESTS

Performance test were run on the test model separator using oil-water mixtures of No. 2, No. 4 and Nigerian crude oils and detergents, such as Gamlen D, Lubrizol Corporation additive OS No. 29817A and Ajax liquid cleaner. The oil-water mixtures were emulsified by passage through a centrifugal pump. Drop size distributions of the input and output to the separator were measured using a Coulter Counter Model $Z_B$. Total oil content was obtained by suitable integration of the drop size distribution. For Example the performance of the separator with No. 4 Fuel Oil is:

1. At a speed of 3,500 rpm and a flow rate of 50 gpm, effluent oil concentrations of 9.6 ppm and 77 ppm were achieved at input concentrations of 4,243 pp, and 25,000 ppm, respectively.

2. The effect of Gamlen D was less severe than with No. 2 oil. Tests run after proper flushing of the test loop resulted in an effluent of 8.6 ppm for an input of 450 ppm.

3. The mean drop size of the No. 4 emulsion was approximately 30 microns so that practically all the oil was separated by the primary separator and discharged through the primary bleed. The subsequent stages of coalescence and separation were hardly required. The effect of detergent on emulsions of No. 4 is mild; the mean drop size is reduced only to 25 microns. The sedimentation behavior of the No. 4 with and without detergent is about the same, but the coalescence and final separation appear to be poorer when running with detergent.

OTHER PERFORMANCE FACTORS

1. The total pressure drop across the machine when the coalescer was fairly free of oil was about 35 psi at 100 gpm, which represents about 2 hp hydraulically. The pressure drop through the clean coalescer was a fraction of 1 psi up to 125 gpm. Even at the highest total oil loadings experienced, the loss through the coalescer itself was less than 10 psi, thanks primarily to the fact that as loading is increased, a greater fraction of the oil is captured upstream of the coalescer.

2. The centrifuge was equipped with a 2 hp motor although this power was never drawn. Due to the swirl of the inlet flow and the inherent conservation of momentum in the rotor design, the centrifuge would freewheel at about 3,000 rpm - dragging the motor with it. Of course, this self-powering features must be at the expense of pressure drop in the flow.

The fundamental basis for design is high throughflow and relatively low rotational speed or contrifugal force with predictable inward gravitation of the light oil phase. Most liquid-liquid centrifuges employ concical plates stacked close together concentric with the machine axis of rotation. This permits very high force fields to be maintained, but the radial flow of liquids between the concial plates promotes secondary flows that limit the through-put possible before separation efficiency deteriorates. The flow of oil and water are necessarily counter to each other between the plates. On the other hand, if the oily water flow is made to be predominately axial then high velocity can be maintained with minimal secondary flow and turbulence. Separation of oil should occur in sufficient axial length.

The centrifugal separator conceived for this program has the following unusual features incorporated into the design:

1. The through-flow during separation is axial with respect to the spinning rotor. This permits steady, liminar but high velocity flow conductive to both coalescence and separation of oil drops.

2. Three stages of separation are provided. A primary stage removes a large fraction of the oil consisting of larger drops prior to enter the coalescing section. A central section of closely spaced concentric, axial cylinders coalesces the small drops of oil A tertiary stage of separation removes the coalesced oil. The primary stage reduces the oil loading on the coalescer and permits the separator to operate of heavy oil concentrations without the need for a preliminary settling tank.

3. For the separator size the flow is large and the dynamic intensity is low compared to typical liquid centrifuges.

4. Centrifugal pump and turbine sections are provided before and after the separator sections in order to conserve power and possibly make the unit flow driven without external drive power.

A schematic illustration of the centrifuge is shown in FIGS. 1, 2A, and 2B. Axial flow, and separation of the oily water takes place in the outer annular portion of the cylindrical rotor, shown sectioned in FIGS. 1, 2A, and 2B. The annulus is nearly filled with plates and cylindrical elements closely spaced to collect the oil. The conical ends of the rotor contain blades and passageways that act as centrifugal pump and centripetal turbine elements at the inlet and outlet ends, respectively. Thus, the flow entering and leaving the rotor has relatively low swirl velocity, but it is maintained at full rotor peripheral velocity in the axial annulus at little expense of energy. Such energy convervation is not possible with typical conical-plate centrifuges because of viscous coriolis forces in radial flow between plates causing the flow to be dragged up to speed and not to be pumped.

The rotor is supported by inlet and outlet housings at opposite ends. The housings contain standard bearings and seals and direct the flow in a vortex fashion to substantially match the inlet and outlet conditions of the rotor. The central shaft of the rotor assembly extends through the housings, providing oil drains on the axis and external drive capability.

The mounting configuration shown is convenient but not exclusive. A significant feature of the concept is that with proper design of the input and output ends, the centrifuge can be flow-driven, requiring no external drive.

The heart of the machine is in the prior rotor flow annulus, which deserves detail explanation. An assembly drawing of the device is given in FIGS. 2A and 2B. This shows the large cylindrical flow annulus that comprises the outer one quarter of the radial span, connected at either end to the conical pump-turbine sections. The flow leaves the pump section and enters the first portion of the annulus, which is a set of closely spaced radial vanes 59.

After the radial vanes, the flow enters a set of swept vanes 60, shown in FIG. 5 with the rotor shell and previous sections removed. This also shows radial slots 61 and 29 that drain oil to the central shaft.

Figure 7:
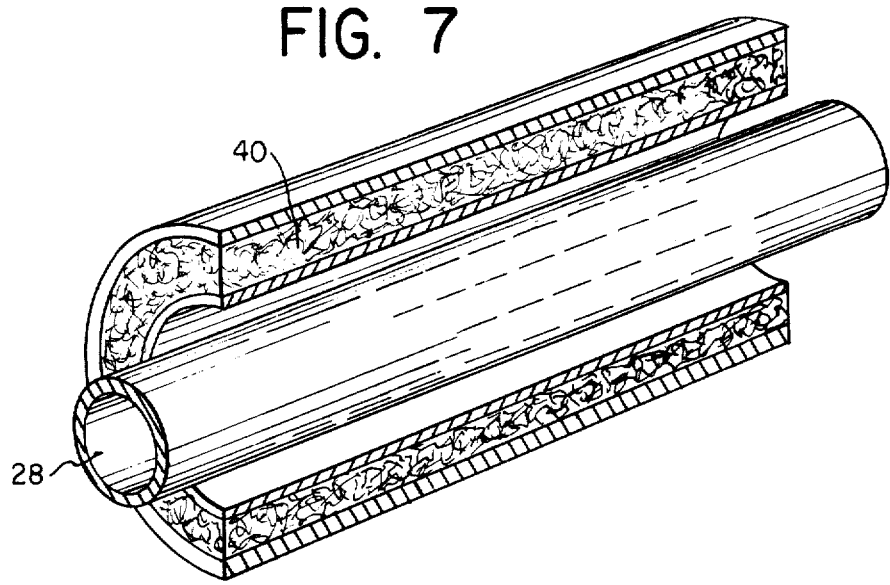
FIG. 7 is an end view of the coalescer second stage portion of the rotor.

Flow from the swept vanes enters the second stage, a long section made of thin sheet metal closely wrapped around the rotor central drum. The inlet end is shown in FIG. 7, including a spider for supporting the outer shell, and the central shaft oil drain holes for the (absent) swept vane stage. The flow is basically axial with respect to the spinning rotor in gaps between successive wraps of the sheet metal, the gaps maintained by dimples on the sheet metal.

The sections after the cylindrical wrap are duplicates of the initial concial passage, radial vane, and swept vane sections, in reverse order. The entire rotor interior sequence is shown in FIGS. 2A and 2B, in which the flow would proceed from left to right.

The functions of the rotor sections can be explained with reference to the flow path:

a. The flow is accelerated to substantially peripheral velocity in the conical pump section;

b. The flow is distributed, made substantially axial with respect to the spinning rotor, and reduced to substantially laminar conditions in the radial vane straightener section;

c. Radial migration and drainage of large oil particles and steams takes place in the upstream swept vane separator section;

d. Radial migration and agglomeration of small oil droplets occurs in the cylindrical wrapped coalescer section;

e. The oil issuing from all layers of the coalescer in the form of large drops and streams migrates inward and is drained in the downstream separator section;

f. Flow is maintained substantially laminar and final oil-water stream separation occurs in the outlet straightener section;

g. Swirl momentum of the flow is recovered in the conical turbine section.

In general, this separation of functions between stages is unusual for a centrifuge. An important element of the device is the coalester. Here flow is maintained substantially laminar for a great length, or residence time, so that radial migration of small droplets across the small gaps can occurs even though throughflow is high and centrifugal force is comparatively low.

Figure 8:
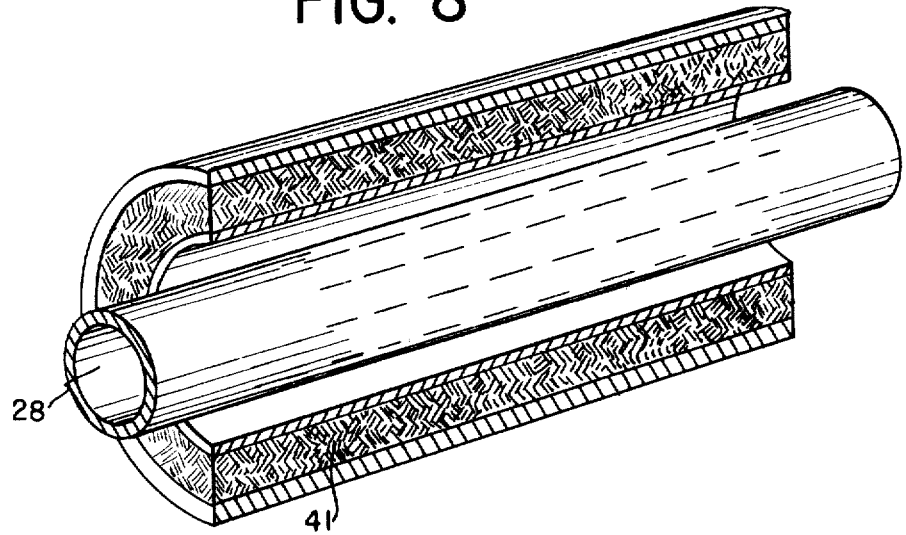
FIG. 8 is an illustration of an alternate form of coalescer or second stage which utilizes porous open-celled material.

FIGS. 7 and 8 illustrate other constructions of the coalescer than that previously described. In FIG. 7, the coalescer consists of open-celled material 40 having interconnecting generally axially oriented passages. In this form of coalescer it should be possible to provide oil drain removal means along the rotor axis throughout the length of the coalescer.

The embodiment of FIG. 8 utilizes fibrous material 41 wherein the fibers are axially oriented so as to capture and coalesce small drops of the light phase fluid. The principle of operation for both embodiments of FIGS. 7 and 8 is essentially the same as for the embodiment of FIGS. 1-6.

It will be understood that the foregoing description has been of a particular embodiment or embodiments of the invention which are merely representative. Therefore, in order to appreciate the scope of the invention, reference should be made to the appended claims:

We claim the following to be our invention:

1. A centrifuge for the separation of substantially immiscible liquids forming a mixture of light and heavy liquids comprising a casing, liquid inlet means into said casing for admission thereto of a mixture of said light and heavy liquids, a rotor within said casing, means for journalling said rotor, said rotor having three stages, said first stage comprising a multiplicity of axially and radially extending surface members spaced apart sufficiently to permit relatively large drops of the light liquid to flow as drops and streams radially toward the axis of said rotor as the heavy liquid is forced to migrate radially outwardly toward the casing under the influence of centrifugal forces, means adjacent to radially inward ends of said surface members for permitting flow of (said) separated light liquid from radially inward portions of said rotor and from said casing, the second stage comprising means defining relatively long substantially radially narrow axial passages extending lengthwise (and centrally) of the rotor(,) for receiving flow of unseparated light and heavy liquids from said first stage, the length and number of said passages being sufficient to cause coalescence of (relatively small drops of) substantially the remainer of said light liquid from small drops to (form) larger drops thereof during axial flow of said light and heavy liquids in a direction away from said first stage, a third stage downstream of said second stage comprising a multiplicity of axially and radically extending surface members and means for receiving flow of heavy and light liquids from said second stage, said surface members being spaced apart sufficiently to permit the relatively large drops received from said second stage to separate from said heavy liquid and to flow radially inwardly as said drops are displaced from said heavy liquid under the influence of centrifugal forces, means for removing said drops of light liquid from said rotor and casing and outlet means for removing the heavy liquid from said casing adjacent to said third stage.

2. The centrifuge of claim 1 wherein said first stage includes means for accelerating said mixture substantially to the peripheral velocity of said rotor, such that said mixture thereafter substantially has only axial flow with respect to said rotor.

3. The centrifuge according to claim 1 wherein said surface members of said first and third stages are vanes, the radially outer portions of said vanes are substantially parallel and are inclined in an intermediate radial and tangential direction.

4. The centrifuge according to claim 1 wherein said second stage comprises closely spaced generally concentric sheets of material.

5. The centrifuge according to claim 1 wherein said second stage comprises porous open celled material and the like.

6. The centrifuge according to claim 2 wherein said first stage includes a bladed pump for increasing the angular velocity of the incoming flow if liquid to a value nearly equal to the angular velocity of said rotor.

7. The centrifuge according to claim 6 wherein a bladed turbine forming part of said rotor is located downstream of said third stage to receive flow of liquid therefrom, said bladed turbine passing said liquid to the outlet flow exit of said casing while recovering substantially the amount of energy therefrom which was initially required to increase the angular velocity of incoming flow in said first stage to rotor speed.

8. The centrifuge according to claim 1 wherein a bladed turbine forming part of said rotor is located downstream of said third stage to receive flow of liquid therefrom, said bladed turbine passing said liquid to the outlet flow exit of said casing while recovering energy therefrom.

9. A method of separating a lighter liquid substantially immiscibly mixed with a heavier liquid comprising the steps of rotating said liquids to subject them to high centrifugal forces, moving said liquids axially through a first zone wherein relatively large drops of said lighter liquid are displaced substantially radially inwardly by said heavier liquid and brought into contact with spaced radial and axial surface members, removing said displaced lighter liquids, causing the remainer of said heavier liquid and lighter liquid to move axially through a second zone where centrifugal and fluid shear forces act to effect coalescence of said lighter liquid into larger drops or a film, releasing said film, drops, and heavier liquid into a third zone wherein said film forms large drops and impinging said drops on spaced radial and axial surface members and removing said heavier liquid outwardly of said surface members while removing said lighter material inwardly of said members.

* * * * *